(12) United States Patent
Everman et al.

(10) Patent No.: US 12,271,283 B2
(45) Date of Patent: Apr. 8, 2025

(54) SYSTEMS AND METHODS FOR DETERMINING A USER SPECIFIC MISSION OPERATIONAL PERFORMANCE METRIC, USING MACHINE-LEARNING PROCESSES

(71) Applicant: GMECI, LLC, Beavercreek, OH (US)

(72) Inventors: Bradford R. Everman, Haddonfield, NJ (US); Brian Scott Bradke, Brookfield, VT (US)

( * ) Notice: Subject to any disclaimer, the term of this patent is extended or adjusted under 35 U.S.C. 154(b) by 0 days.

(21) Appl. No.: 18/232,676

(22) Filed: Aug. 10, 2023

(65) Prior Publication Data

US 2023/0385172 A1 Nov. 30, 2023

Related U.S. Application Data

(63) Continuation of application No. 17/333,209, filed on May 28, 2021, now Pat. No. 11,762,753.

(51) Int. Cl.
*G06F 11/34* (2006.01)
*G06F 18/214* (2023.01)
(Continued)

(52) U.S. Cl.
CPC ...... *G06F 11/3428* (2013.01); *G06F 18/2155* (2023.01); *G06F 18/24155* (2023.01); *G06F 18/2431* (2023.01); *G06N 20/00* (2019.01)

(58) Field of Classification Search
CPC ............. G06F 11/3428; G06F 18/2155; G06F 18/2431; G06F 18/24155; G06N 20/00
(Continued)

(56) References Cited

U.S. PATENT DOCUMENTS 8,781,796 B2 7/2014 Mott
8,812,428 B2 8/2014 Mollicone
(Continued)

OTHER PUBLICATIONS

Title: Ensemble machine learning models for aviation incident risk prediction By: Zhang Date: Jan. 2019.
(Continued)

*Primary Examiner* — Aditya S Bhat
(74) *Attorney, Agent, or Firm* — Caldwell Intellectual Property Law

(57) ABSTRACT

Aspects relate to system and methods for determining a user specific mission operational performance, using machine-learning processes. An exemplary system includes a computing device configured to perform operations including receiving user-input structured data from at least a user device, receiving observed structured data related to the user and a mission performance metric, inputting the user-input structured data and the observed structured data to a machine-learning model, generating a user performance metric as a function of the machine-learning model, receiving a deterministic mission operational performance metric, disaggregating a deterministic user performance metric as a function of the deterministic mission operation performance metric and the mission performance metric, inputting training data to a machine-learning algorithm, where the training data includes the user-input structured data and the observed structured data correlated to the deterministic user performance metric, and training the machine-learning model as a function of the machine-learning algorithm and the training data.

20 Claims, 6 Drawing Sheets

(51) Int. Cl.
*G06F 18/2415* (2023.01)
*G06F 18/2431* (2023.01)
*G06N 20/00* (2019.01)

(58) Field of Classification Search
USPC .......................................... 702/186
See application file for complete search history.

(56) References Cited

U.S. PATENT DOCUMENTS

| | | |
|---|---|---|
| 10,043,397 B2 | 8/2018 | Salentiny |
| 11,410,085 B1 * | 8/2022 | Mudgil ................... G06F 18/24 |
| 2016/0270718 A1 | 9/2016 | Heneghan |
| 2020/0241525 A1 | 7/2020 | Harbour |
| 2021/0158213 A1 * | 5/2021 | Shirakawa ............ G06F 18/214 |
| 2023/0244998 A1 * | 8/2023 | Roberts ................... G06N 5/04 |
| | | 706/12 |

OTHER PUBLICATIONS

Title: Aviation Fatigue: Issues in Developing Fatigue Risk Management Systems By: Weiland Date: May 10, 2016.
Title: Neuroscientific tools in the cockpit: towards a meaningful decision support system for fatigue risk management By: Papanikou Date: May 29, 2020.

* cited by examiner

SYSTEMS AND METHODS FOR DETERMINING A USER SPECIFIC MISSION OPERATIONAL PERFORMANCE METRIC, USING MACHINE-LEARNING PROCESSES

CROSS-REFERENCE TO RELATED APPLICATIONS

This application is a continuation of Non-provisional application Ser. No. 17/333,209 filed on May 28, 2021, and entitled "SYSTEMS AND METHODS FOR DETERMINING A USER SPECIFIC MISSION OPERATIONAL PERFORMANCE METRIC, USING MACHINE-LEARNING PROCESSES," the entirety of which is incorporated herein by reference.

FIELD OF THE INVENTION

The present invention generally relates to the field of artificial intelligence, machine learning, and models. In particular, the present invention is directed to systems and methods for determining a user specific mission operational performance metric, using machine-learning processes.

BACKGROUND

A mission's predicted performance may not be easily predicted using only observational information. For example, certain risks associated with personnel may be related to personal factors that are not captured through third-party measures. In some cases, personnel may not be willing to share these personal factors prior to a mission, obfuscating these factors existence and preventing their use in mission planning or mission resource utilization.

SUMMARY OF THE DISCLOSURE

In an aspect, a system for determining a user specific mission operational performance, using machine-learning processes, includes a computing device configured to perform operations including receiving user-input structured data from at least a user device, receiving observed structured data related to the user and a mission performance metric, inputting the user-input structured data and the observed structured data to a machine-learning model, generating a user performance metric as a function of the machine-learning model, receiving a deterministic mission operational performance metric, disaggregating a deterministic user performance metric as a function of the deterministic mission operation performance metric and the mission performance metric, inputting training data to a machine-learning algorithm, where the training data includes the user-input structured data and the observed structured data correlated to the deterministic user performance metric, and training the machine-learning model as a function of the machine-learning algorithm and the training data.

In another aspect a method of determining a user specific mission operational performance metric, using machine-learning processes, including receiving, using a computing device, user-input structured data from at least a user device, receiving, using the computing device, observed structured data related to the user and a mission performance metric, inputting, using the computing device, the user-input structured data and the observed structured data to a machine-learning model, generating, using the computing device and the machine-learning model, a user performance metric as a function of the machine-learning model, receiving, using the computer device, a deterministic mission operational performance metric, disaggregating, using the computing device, a deterministic user performance metric as a function of the deterministic mission operation performance metric and the mission performance metric, inputting, using the computing device, training data to a machine-learning algorithm, where the training data includes the user-input structured data and the observed structured data correlated to the deterministic user performance metric, and training, using the computing device and the machine-learning algorithm, the machine-learning model as a function of the machine-learning algorithm and the training data.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for determining a user specific mission operational performance metric, using machine-learning processes. In an embodiment, a user may provide user-input by way of a remote device, for example a personal device, such as a phone or tablet.

Aspects of the present disclosure can be used to query a user for personal information anonymously, without a need for intermediary interrogators. Aspects of the present disclosure can also be used to use user-input personal information in predicting performance of a mission. This is so, at least in part, because factors related to personal information can affect an outcome of a mission.

Aspects of the present disclosure allow for training and re-training of machine-learning processes through training data that correlates personal information to past mission performance. Exemplary embodiments illustrating aspects of the present disclosure are described below in the context of several specific examples.

Figure 1:
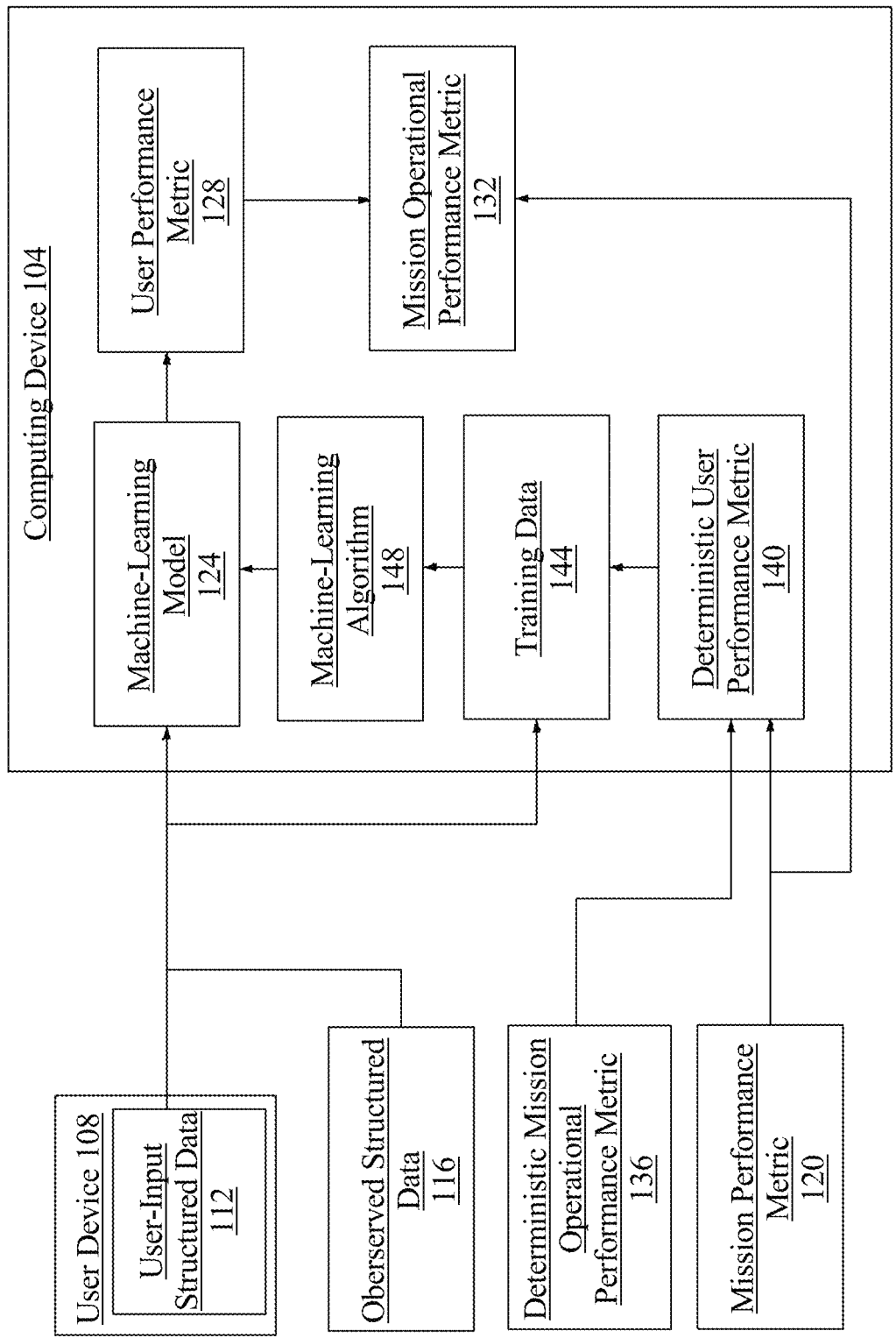
FIG. 1 is a block diagram illustrating an exemplary system for determining a user specific mission operational performance metric, using machine-learning processes.

Referring now to FIG. 1, an exemplary embodiment of a system 100 for determining a user specific mission operational performance metric is illustrated. System includes a computing device 104. Computing device 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of system 100 and/or computing device.

With continued reference to FIG. 1, computing 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, an exemplary system 100, for determining a user specific mission operational performance metric, is illustrated. A computing device 104 is configured to be communicatively connected to at least a user device 108. As used herein, a device, component, or circuit is "communicatively connected" where the device, component, or circuit is able to receive data from and/or transmit data to another device, component, or circuit. In an embodiment, devices are placed in communicative connection by electrically coupling at least an output of one device, component, or circuit to at least an input of another device, component, or circuit. Devices may further be placed in communicatively connection by creating an optical, inductive, or other coupling between two or more devices. Communicatively connected device may be placed in near field communication with one another. Two or more devices may be communicatively connected where two or more devices are configured to send and/or receive signals to or from each other. Placement of devices in communicative connection may include direct or indirect connection and/or transmission of data; for instance, two or more devices may be connected or otherwise communicatively connected by way of an intermediate circuit. Placement of devices in communicative connection with each other may be performed via a bus or other facility for intercommunication between elements of computing device 104 as described in further detail below. Placement of devices in communicative connection with each other may include fabrication together on a shared integrated circuit and/or wafer; for instance, and without limitation, two or more communicatively coupled devices may be combined in a single monolithic unit or module. Computing device 104 may be configured to receive user-input structured data 112 from at least a user device 108. As used in this disclosure, "user-input structured data" is any data input to a device by a user, for example to a user device, that is structured. "Structured," as used in this disclosure, when referring to data indicates that data elements are formalized, labeled, categorized, or otherwise sorted in a meaningful way. In some cases, computing device 104 may generate at least a form for data entry on remote device 108. At least a form may include a structure. For example, each form may include any of a label, a classification, a category, and the like. In some cases, at least a form may include a questionnaire, web form, or similar to prompt and record user entries. In some cases, user-input structured data may include freeform entries, selections from premade lists, sliders, drop-downs, or the like. In some cases, user-input structured data 112 may be gathered anonymously by way of remote device 108 from a user. In some cases, user-input structured data 112 may include subjective information associated with a user, for example how the user feels or feels about an upcoming or potentially upcoming mission.

Within continued reference to FIG. 1, computing device 104 may receive observed structured data 116 related to user. "Observed structured data," as used in this disclosure, is structured data that relates to an individual, for example a user or subject, and may be ascertained solely from observation; this is in contrast to non-observational data which may require knowledge of the individual's internal perceptions. Observed structured data may include substantially objective data, for example amount of time since last deployment, duration of last deployment, and the like. In some embodiments, computing device may additionally receive a mission performance metric 124. As used in this disclosure, "mission performance metric" refers to a measure relating to a mission or an environmental context of a mission. A mission performance metric may include objective data associated with either a mission or an environment or both. Mission performance metric may include risk factors inherent to a mission, for example a flight mission. Mission performance metric may include environmental risk factors. Non-limiting examples of mission performance metrics include location of mission, environmental conditions of location of a mission, such as climate, temperature, precipitation, and the like, duration of mission, mission objectives, mission requirements, mission constraints, mission participants/personnel, mission equipment/resources, and the like.

With continued reference to FIG. 1, computing device may input user-input structured data 112 and observed structured data 116 to a machine-learning model 124. Computing device 104 may perform determinations, classification, and/or analysis steps, methods, processes, or the like as described in this disclosure using machine learning processes. A "machine learning process," as used in this disclosure, is a process that automatedly uses a body of data known as "training data" and/or a "training set" to generate an algorithm that will be performed by a computing device/module to produce outputs given data provided as inputs; this is in contrast to a non-machine learning software program where the commands to be executed are determined in advance by a user and written in a programming language. Machine learning-model 124 may include any machine-learning model as described in this disclosure, for example below. Computing device 104 may generate a user performance metric 128 as a function of machine learning model 124. As used in this disclosure, a "user performance metric" is a measure that is related to an individual's predicted ability to perform. User performance metric 128 may include a risk factor. User performance metric 128 may include a likelihood of user's success, for example on a mission. In some embodiments, computing device 104 may additionally generate at least a likelihood metric as a function of machine learning model 128. As used in this disclosure, a "likelihood metric" is a probabilistic measure or score representing a confidence associated with a use of a machine-learning process. For example, in some cases a user performance metric 128 may be generated along with a corresponding likelihood metric. For example, a user performance metric may include a risk factor of 1 on a 1 to 10 (low to high) risk scale and a 95% likelihood metric, referring to a high 95% confidence in the user performance metric generation. Generation of the likelihood metric may be performed using any machine-learning process described in this disclosure. For example, in cases where a machine-learning process uses a mean squared error (MSE) cost function, formal statistical methods may be used to determine a likelihood matric as a function of confidence of a trained machine-learning model. In some cases, a mean squared error found with a validation set can be used as an estimate for variance. This estimated variance value may be used to calculate a confidence interval of network output which assumes a normal distribution.

Still referring to FIG. 1, in some embodiments, computing device 104 may be configured to select machine-learning model 124, for example from a plurality of machine-learning models. For example, in some cases, computing device 104 may receive a user identifier. User identifier may include any of a unique identifier code, a name, a code-name, and the like. User identifier may identify user as an individual or as a member of one or more groups or classifications. Computing device 104 may then, in some cases, select machine-learning model 124 as a function of user identifier. In some versions, computing device may classify a user for example as a function of a user identifier. Computing device 104 may, in some cases, classify a user identifier to a user class. A user class may include a cohort, a demographic and the like. In some cases, classifying user identifier may additionally include inputting the user identifier to a classifier, and classifying the user identifier to user class, as a function of the classifier. A classifier may include any classifier as described in this disclosure, for example below. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Computing device 104 and/or another device may generate a classifier using a classification algorithm, defined as a processes whereby a computing device 104 derives a classifier from training data. Classification may be performed using, without limitation, linear classifiers such as without limitation logistic regression and/or naïve Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, computing device 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)+P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device 104 may then calculate a likelihood table by calculating probabilities of different data entries and classification labels. Computing device 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, computing device 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm: $l=\sqrt{\sum_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With continued reference to FIG. 1, computing device 104 combine user performance metric 128 and mission performance metric 120 to form a mission operational performance metric 132. As used in this disclosure, "combining" user performance metric 128 and mission performance metric 120 to a mission operational performance metric 132 may include any method of combination, including aggregation. For example, in some cases mission performance metric 120 may include at least a numeric quantification and user performance metric may include at least a numeric quantification and combining the two may include at least one of a mathematical means of aggregation including, without limitation, multiplication, additional, and/or exponential relationships. As used in this disclosure, a "mission operational performance metric" is a value that represents predicted performance. For example, in some cases, a mission operational performance metric 132 may be a representation of predicted performance for an individual user and a certain mission. In some cases, at least two mission operational performance metrics 132 are determined and compared. For example, in some cases, more than one user may be considered for a mission or a single user may be considered for more than one mission. In some cases, a mission operational performance metric may have a probabilistic value, for example a value between 0 and 1, with 0 representing certain failure and 1 representing certain success. Alternatively or additionally, in some cases, operational performance metric may be classified into one of a finite number of classifications; for example, classifications may include "high probability of success," "low probability of success," "moderate probability of success," and the like. In some cases, mission operational performance metric may be color-coded; for example, low probability of success may be red and high probability of success may be green.

With continued reference to FIG. 1, computing device 104 may additionally receive a deterministic mission operational performance metric 136. "Deterministic mission operational performance metric," as used in this disclosure, is a measure that is related to performance of a mission. Deterministic mission operational performance metric may be associated with a mission that has already been completed, for example by a user. In some cases, deterministic mission operational performance metric may include any of a grade, a proportion, for example a proportion of objectives achieved, a score, and the like.

With continued reference to FIG. 1, computing device 104 may disaggregate a deterministic user performance metric as a function of the deterministic mission operation performance metric 136 and the mission performance metric 120. As used in this disclosure, a "deterministic user performance metric" is a measure that is related to an individual's determined ability to perform. A deterministic user performance metric may be determined after an individual has performed a mission. Deterministic user performance metric 140 may be derived directly from a deterministic mission operation performance metric 136; or, in some cases, the deterministic user performance metric may be disaggregated from the deterministic mission operation performance metric and another measure, for example mission performance metric 120.

With continued reference to FIG. 1, computing device 104 may input training data 144 to a machine-learning algorithm 148. In some cases, training data 144 may correlate user-input structured data 112 and/or observed structured data 116 to deterministic user performance metrics 140 and/or to quantitative values usable for calculation thereof; for instance, training data 144 may include a plurality of training examples containing such correlations, which may have been collected during previous iterations of methods described herein and/or from inputs of data describing past missions or the like. In some cases, training data 144 may include historical information from past missions, including any of, for example, mission success rates, observed-structured data 116, user-input structured data 112, mission performance metric 120, deterministic mission operational performance metric 136, and the like. In some cases, training data may include theoretical data which is non-empirical. For example, in some cases, training data may include expert diagnosed thresholds for inputs which are correlated to certain user performance metrics. As an example, certain user-input structured data 112 or observer structured data 116 may be predetermined by an expert user to correlate to a change, such as a decrease in a probability for success, in a user performance metric 128. For example, observed structured data 116 or user-input structured data 112 may have hours of sleep in past 24 hours and a theoretical limit in the training data may be 2 hours, such that any user who has slept less that 2 of the past 24 hours will have a predicted user performance metric 128 indicative of a substantially lower probability of success. In some cases, machine-learning algorithm 148 may include a supervised machine learning algorithm and user-input structured data 112 and observed structured data 116 may be labeled as inputs and deterministic user performance metric 140 may be labeled as an output in training data 144. Alternatively or additionally machine-learning algorithm 148 may include an unsupervised machine learning algorithm. Computing device 104 may train machine-learning model 124 as a function of machine-learning algorithm 148 and training data 144. "training data," as used in this disclosure, is data containing correlations that a machine-learning process may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Still referring to FIG. 1, alternatively or additionally, training data may include one or more elements that are not categorized; that is, training data may not be formatted or contain descriptors for some elements of data. Machine-learning algorithms and/or other processes may sort training data according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data to be made applicable for two or more distinct machine-learning algorithms as described in further detail below. Training data used by computing device 104 may correlate any input data as described in this disclosure to any output data as described in this disclosure. As a non-limiting illustrative example user-input structured data 112 and observed structured data 116 as inputs correlated to deterministic user performance metric 140 as an output.

Still referring to FIG. 1, in some embodiments, computing device 104 may additionally include repeating some or all operations described above. For example, computing device may receive second user-input structured data 112 from at least a user device 108, receive second observed structured data 116 related to user and a second mission performance metric 120, input the second user-input structured data 112 and the second observed structured data 116 to machine-learning model 124, generate, using the machine-learning model, a second user performance metric 128 as a function of the machine-learning model.

Still referring to FIG. 1, in some embodiments, computing device 104 may additionally generate an image representing a user performance metric 128. In some cases, computing device may graphically represent an image representing the user performance metric 128. For example, computing device 104 may generate a graph. Graph may have user performance metric along a dependent axis. Graph may have time, mission, or the like along an independent axis. For example, in some embodiments, graph may display user performance metric 128 and second user performance metric 128 together.

Still referring to FIG. 1, according to some embodiments, system 100 may be incorporated with one or more additional systems including sensors and processors. For example, system 100 may be employed with an earcup system as taught by U.S. patent application Ser. No. 16/859,483 entitled "HUMAN PERFORMANCE OXYGEN SENSOR," by B. Everman et al., which is incorporated herein by reference, in its entirety. Additionally or alternatively, in some embodiments, system 100 may be employed with an exhalation sensor system as taught by U.S. patent application Ser. No. 16/933,680 entitled "COMBINED EXHALED AIR AND ENVIRONMENTAL GAS SENSOR APPARATUS," by B. Everman et al., which is incorporated herein by reference, in its entirety. In some cases, additional sensors and processors may be used to provide additional metrics for observed structured data 116.

Figure 2:
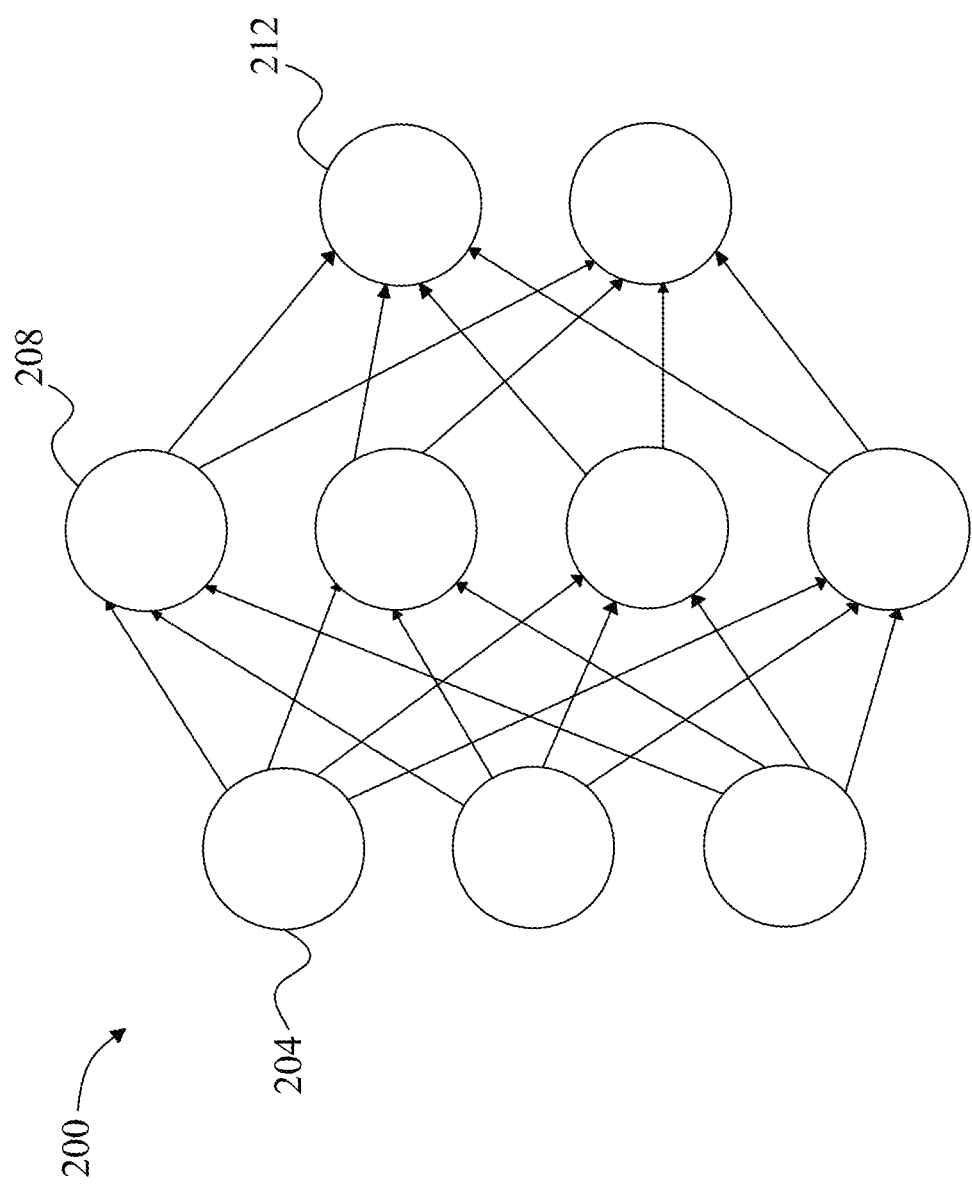
FIG. 2 is a schematic diagram of an exemplary embodiment of a neural network.

Referring now to FIG. 2 an exemplary embodiment of neural network 200 is illustrated. Neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 204, one or more intermediate layers 208, and an output layer of nodes 212. Connections between nodes may be created via the process of "training" the network, in which elements from a training dataset are applied to input nodes 204, a suitable training algorithm (such as Levenberg-Marquardt, conjugate gradient, simulated annealing, or other algorithms) is then used to adjust the connections and weights between nodes in adjacent layers 208 of the neural network to produce the desired values at output nodes 212. This process is sometimes referred to as deep learning.

Figure 3:
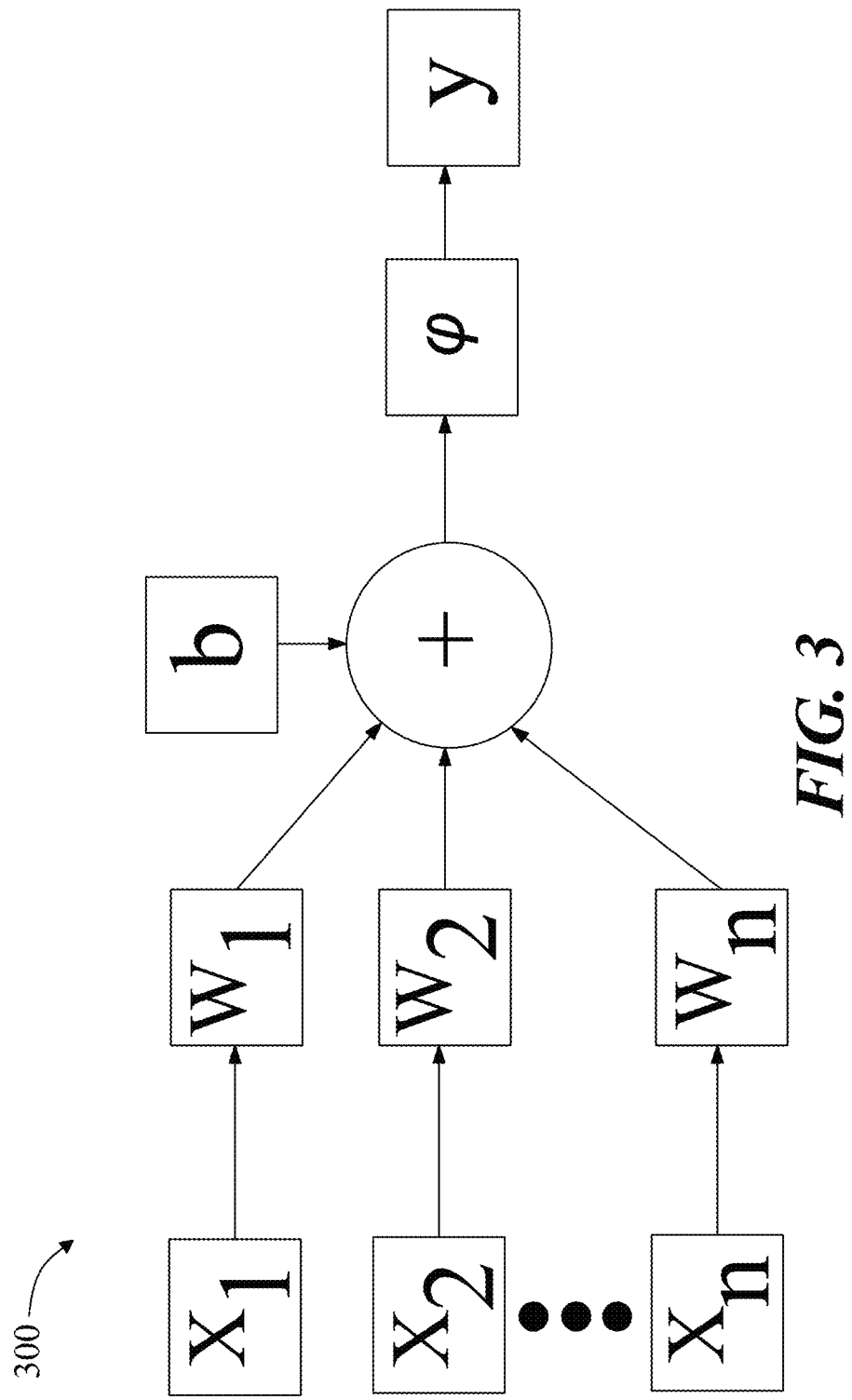
FIG. 3 is a schematic diagram of an exemplary embodiment of a node of a neural network.

Referring now to FIG. 3, an exemplary embodiment of a node 300 of a neural network is illustrated. A node 300 may include, without limitation a plurality of inputs xi that may receive numerical values from inputs to a neural network containing the node and/or from other nodes. Node 300 may perform a weighted sum of inputs using weights $w_i$ that are multiplied by respective inputs xi. Additionally or alternatively, a bias b may be added to the weighted sum of the inputs such that an offset is added to each unit in the neural network layer that is independent of the input to the layer. The weighted sum may then be input into a function co, which may generate one or more outputs y. Weight $w_i$ applied to an input xi may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Still referring to FIG. 3, a neural network may, for example without limitation, receive at least a feature 108 and/or at least a probabilistic output 128 as inputs and output an intervention class 132 and a classification score representing a probability of classification to a predetermined class according to weights $w_i$ that are derived using machine-learning processes as described in this disclosure.

Figure 4:
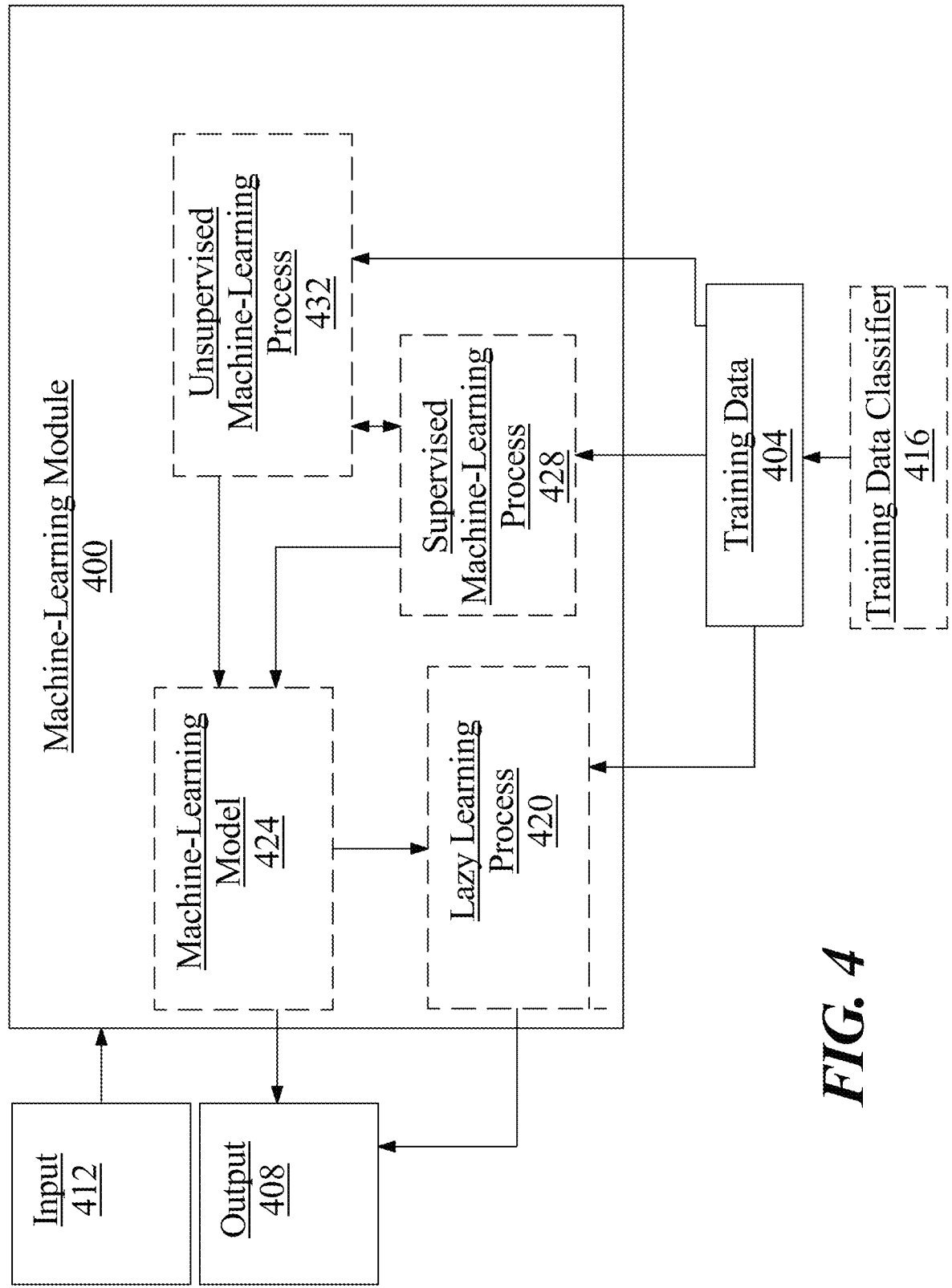
FIG. 4 is a block diagram illustrating an exemplary embodiment of a machine-learning module.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as described above is data containing correlations that a machine-learning process may use to model relationships between two or more categories of data elements. For instance, and without limitation, training data 404 may include a plurality of data entries, each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example inputs may include user-input structured data and outputs may include deterministic user performance metrics.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to individual users, cohorts of users, demographics, or user classes.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include user-input structured data and/or observed structured data as described above as inputs, deterministic user performance metrics as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 5:
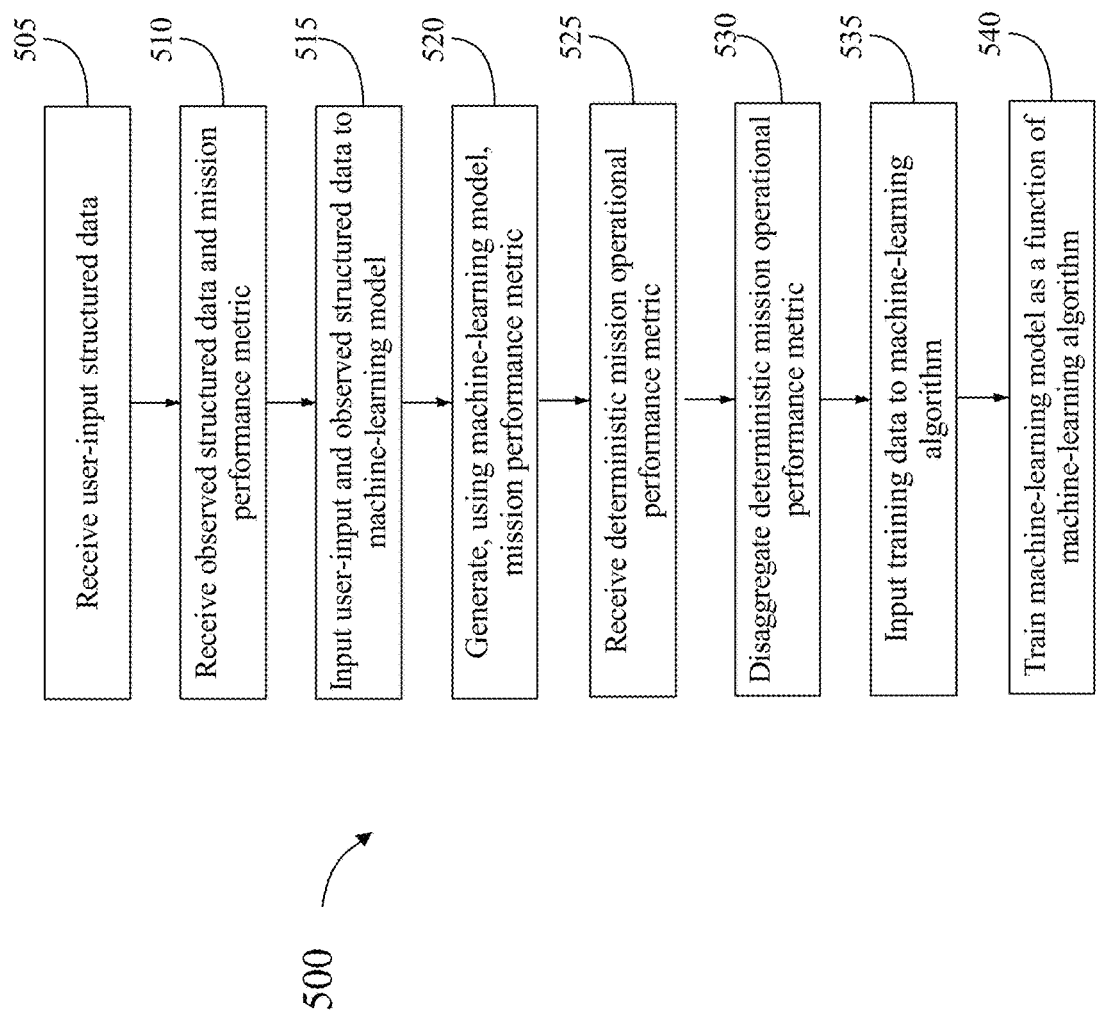
FIG. 5 is a flow diagram illustrating an exemplary method of determining a user specific mission operational performance metric, using machine-learning processes.

Referring now to FIG. 5, an exemplary method 500 of determining a user specific mission operational performance metric is shown. At step 505, computing device receives a user-input structured data from at least a user device. Computing device may include any computing device as described in this disclosure, for example in reference to FIGS. 1-4. User-input structured data may include any user-input structured data described in this disclosure, for example in reference to FIGS. 1-4. User device may include any user device described in this disclosure, for example in reference to FIGS. 1-4. In some embodiments, method 500 may additionally include generating at least a formal input on the user device for the user-input structured data. Formal input may include any formal input described in this disclosure, for example in reference to FIGS. 1-4.

With continued reference to FIG. 5, at step 510, computing device receives observed structured data related to user and a mission performance metric. Observed structured data may include any observed structured data described in this disclosure, for example in reference to FIGS. 1-4. Mission performance metric may include any mission performance metric described in this disclosure, for example in reference to FIGS. 1-4.

With continued reference to FIG. 5, at step 515, computing device inputs user-input structured data and observed structured data to a machine-learning model. Machine-learning model may include any machine-learning model described in this disclosure, for example with reference to FIGS. 1-4.

With continued reference to FIG. 5, at step 520, computing device generates, using machine-learning model, a user performance metric as a function of the machine-learning model. User performance metric may include any user performance metric described in this disclosure, for example in reference to FIGS. 1-4.

With continued reference to FIG. 5, at step 525, computing device receives a deterministic mission operational performance metric. Deterministic mission operational performance metric may include any deterministic mission operational performance metric described in this disclosure, for example with reference to FIGS. 1-4.

With continued reference to FIG. 5, at step 530, computing device disaggregates a deterministic user performance metric from deterministic mission operational performance metric. In some cases, disaggregating deterministic user performance metric from deterministic mission operational performance metric, includes disaggregating mission performance metric from the deterministic mission operational performance metric. Deterministic user performance metric may include any deterministic user performance metric described in this disclosure, for example in reference to FIGS. 1-4.

With continued reference to FIG. 5, at step 535, computing device inputs training data to a machine-learning algorithm. In some embodiments, training data may include user-input structured data and observed structured data correlated to deterministic user performance metric. machine-learning algorithm may include any machine-learning algorithm described in this disclosure, for example in reference to FIGS. 1-4. Training data may include any training data described in this disclosure, for example in reference to FIGS. 1-4. In some cases, machine-learning algorithm may include a convolutional neural network, comprising at least a layer of neural nodes.

With continued reference to FIG. 5, at step 540, computing device, using machine-learning algorithm, trains machine-learning model as a function of the machine-learning algorithm and training data.

Still referring to FIG. 5, in some embodiments, method 500 may additionally include combining a mission operational performance metric as a function of user performance metric and mission performance metric. Mission operational performance metric may include any mission operational performance metric described in this disclosure, for example in reference to FIGS. 1-4.

Still referring to FIG. 5, in some embodiments, method 500 may additionally include generating at least a likelihood metric as a function of machine learning model. Likelihood metric may include any likelihood metric described in this disclosure, for example in reference to FIGS. 1-4.

Still referring to FIG. 5, in some embodiments, method 500 may additionally include receiving a user identifier and selecting machine-learning model as a function of the user identifier. User identifier may include any user identifier described in this disclosure, for example in reference to FIGS. 1-4. In some versions, method 500 additionally include classifying user identifier to a user class. User class may include any user class described in this disclosure, for example in reference to FIGS. 1-4. In some cases, classifying user identifier may additionally include inputting the user identifier to a classifier and classifying the user identifier to a user class, as a function of the classifier. Classifier may include any classifier described in this disclosure, for example in reference to FIGS. 1-4. In some cases, classifier may include a naïve Bayesian classifier.

Still referring to FIG. 5, in some embodiments, method 500 may additionally include graphically representing an image representing user performance metric. Image may include any image described in this disclosure, for example in reference to FIGS. 1-4.

Still referring to FIG. 5, in some embodiments, method 500 may additionally include receiving second user-input structured data from at least a user device, receiving second observed structured data related to user and a second mission performance metric, inputting the second user-input structured data and the second observed structured data to machine-learning model, and generating, using the machine-learning model, a second user performance metric as a function of the machine-learning model.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
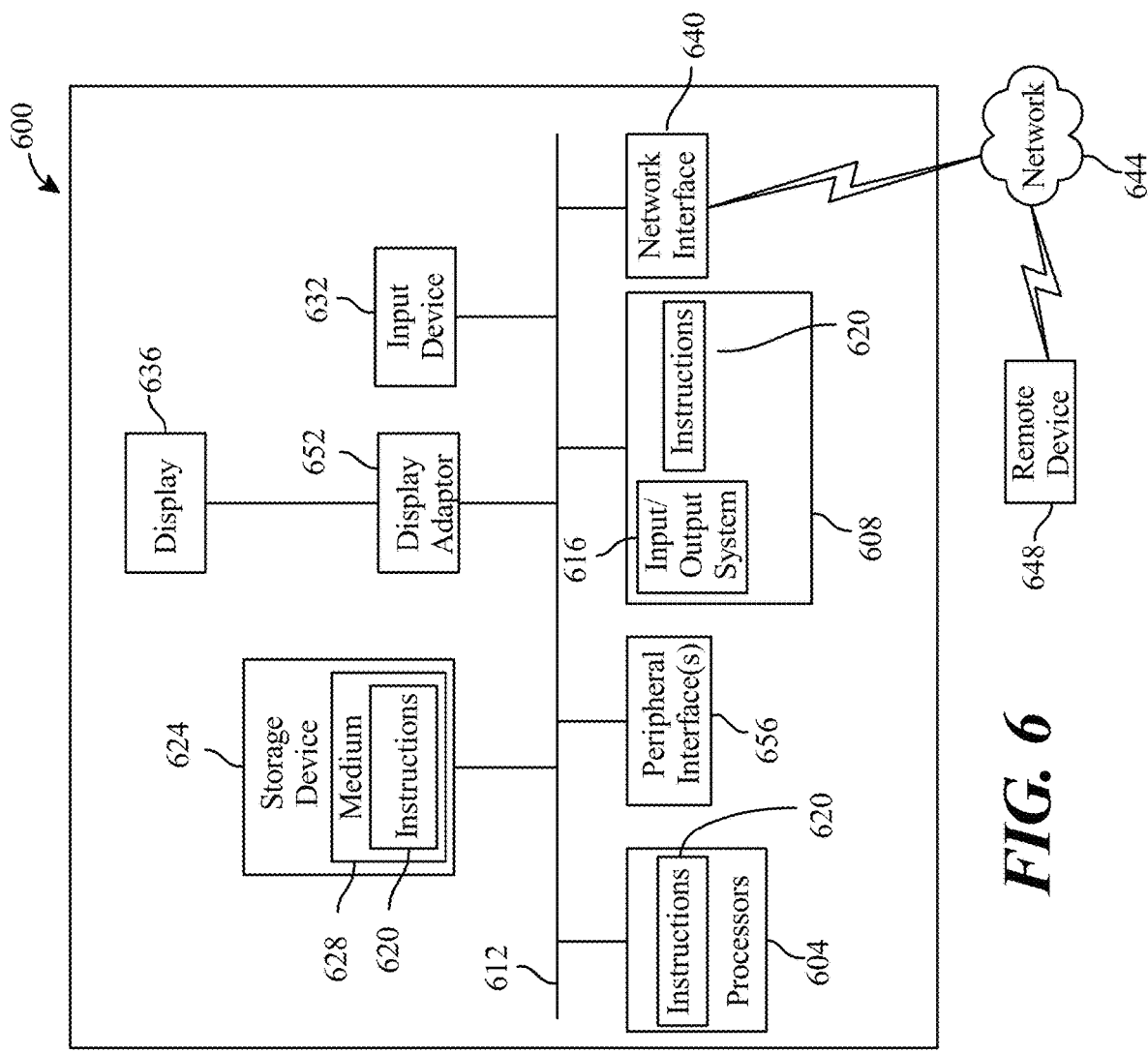
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:
1. A method of determining a user specific mission operational performance metric, using machine-learning processes, comprising:
 receiving, using a computing device, user-input structured data from at least a user device;

receiving, using the computing device, observed structured data related to a user and a mission performance metric associated with a mission of the user;

inputting, using the computing device, the user-input structured data and the observed structured data to a machine-learning model comprising an unsupervised machine learning process configured to continuously discover correlations among the user-input structured data and the observed structured data to a performance metric, wherein the machine learning model is selected based on a user identifier;

generating, using the computing device and the machine-learning model, a user performance metric as a function of the machine-learning model;

inputting, using the computing device, training data into a machine-learning algorithm, wherein the training data includes the user-input structured data and the observed structured data correlated to the user performance metric; and training, using the computing device and the machine-learning algorithm, the machine-learning model as a function of the machine-learning algorithm and the training data.

2. The method of claim 1, further comprising:
receiving, using the computer device, a deterministic mission operational performance metric.

3. The method of claim 2, further comprising:
disaggregating, using the computing device, a deterministic user performance metric as a function of the deterministic mission operation performance metric and the mission performance metric.

4. The method of claim 1, wherein the mission performance metric comprises objective data associated with the mission and a plurality of environmental risk factors.

5. The method of claim 1, wherein the user performance metric comprises a change in a probability for success of the mission.

6. The method of claim 1, wherein the user performance metric comprises a risk factor.

7. The method of claim 1, further comprising:
generating, using the computing device, at least a likelihood metric as a function of the machine learning model.

8. The method of claim 1, further comprising:
classifying, using the computing device, the user identifier to a user class, wherein classifying the user identifier further comprises:
inputting the user identifier to a classifier; and
classifying the user identifier to the user class, as a function of the classifier.

9. The method of claim 1, wherein inputting training data into the machine-learning algorithm comprises:
correlating the user-input structured data and the observed structured data to the deterministic user performance metric.

10. The method of claim 1, further comprising:
receiving, using the computing device, second user-input structured data from the at least a user device;
receiving, using the computing device, second observed structured data related to the user and a second mission performance metric;
inputting, using the computing device, the second user-input structured data and the second observed structured data to the machine-learning model; and
generating, using the computing device and the machine-learning model, a second user performance metric as a function of the machine-learning model.

11. A system for determining a user specific mission operational performance, using machine-learning processes, comprising a computing device configured to perform operations comprising:

receiving, using a computing device, user-input structured data from at least a user device;

receiving, using the computing device, observed structured data related to a user and a mission performance metric associated with a mission of the user;

inputting, using the computing device, the user-input structured data and the observed structured data to a machine-learning model comprising an unsupervised machine learning process configured to continuously discover correlations among the user-input structured data and the observed structured data to a performance metric, wherein the machine learning model is selected based on a user identifier;

generating, using the computing device and the machine-learning model, a user performance metric as a function of the machine-learning model;

inputting, using the computing device, training data into a machine-learning algorithm, wherein the training data includes the user-input structured data and the observed structured data correlated to the user performance metric; and training, using the computing device and the machine-learning algorithm, the machine-learning model as a function of the machine-learning algorithm and the training data.

12. The system of claim 11, wherein the computing device is further configured to:
receiving, using the computer device, a deterministic mission operational performance metric.

13. The system of claim 12, wherein the computing device is further configured to:
disaggregating, using the computing device, a deterministic user performance metric as a function of the deterministic mission operation performance metric and the mission performance metric.

14. The system of claim 11, wherein the mission performance metric comprises objective data associated with the mission and a plurality of environmental risk factors.

15. The system of claim 11, wherein the user performance metric comprises a change in a probability for success of the mission.

16. The system of claim 11, wherein the user performance metric comprises a risk factor.

17. The system of claim 11, wherein the computing device is further configured to:
generating, using the computing device, at least a likelihood metric as a function of the machine learning model.

18. The system of claim 11, wherein the computing device is further configured to:
classifying, using the computing device, the user identifier to a user class, wherein classifying the user identifier further comprises:
inputting the user identifier to a classifier; and
classifying the user identifier to the user class, as a function of the classifier.

19. The system of claim 11, wherein inputting training data into the machine-learning algorithm comprises:
correlating the user-input structured data and the observed structured data to the deterministic user performance metric.

20. The system of claim 11, the computing device is further configured to:

receiving, using the computing device, second user-input structured data from the at least a user device;
receiving, using the computing device, second observed structured data related to the user and a second mission performance metric;
inputting, using the computing device, the second user-input structured data and the second observed structured data to the machine-learning model; and
generating, using the computing device and the machine-learning model, a second user performance metric as a function of the machine-learning model.

\* \* \* \* \*